3,284,589
PROGRAMMER UTILIZING DIAPHRAGM
OPERATED SWITCHES
Robert L. Golden and Clarence Wantz, Greensburg, Pa., and Harold W. Rice, Fullerton, Roland D. Beck, Anaheim, and Reed A. Palmer, Los Alamitos, Calif., assignors to Robertshaw Controls Company, a corporation of Delaware
Filed Mar. 5, 1963, Ser. No. 262,885
8 Claims. (Cl. 200—46)

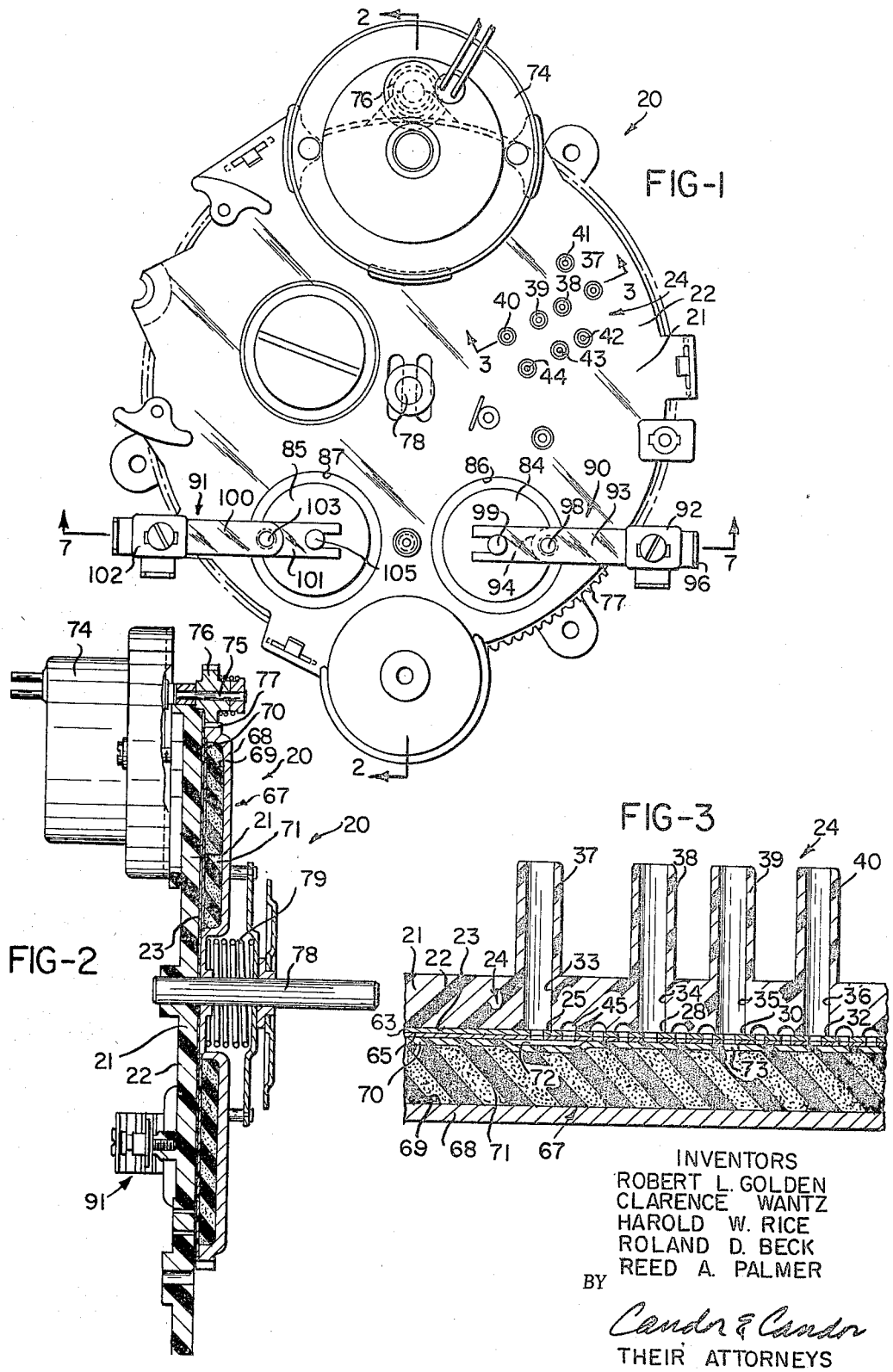

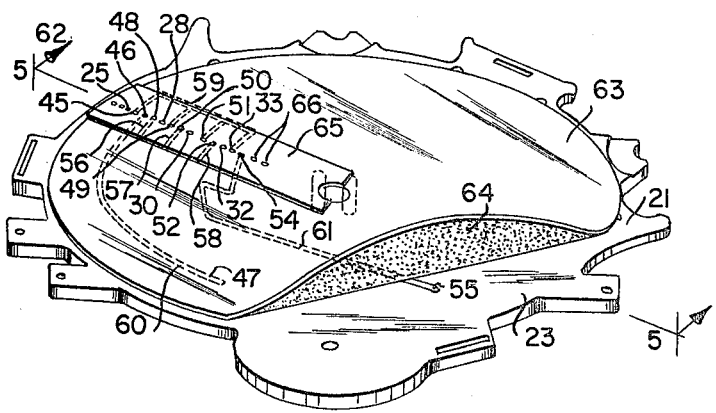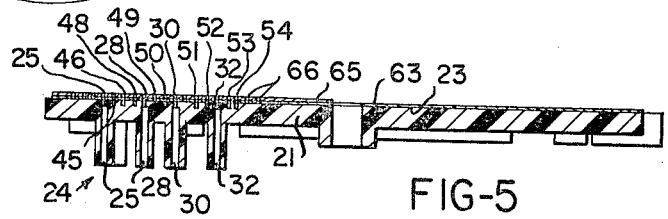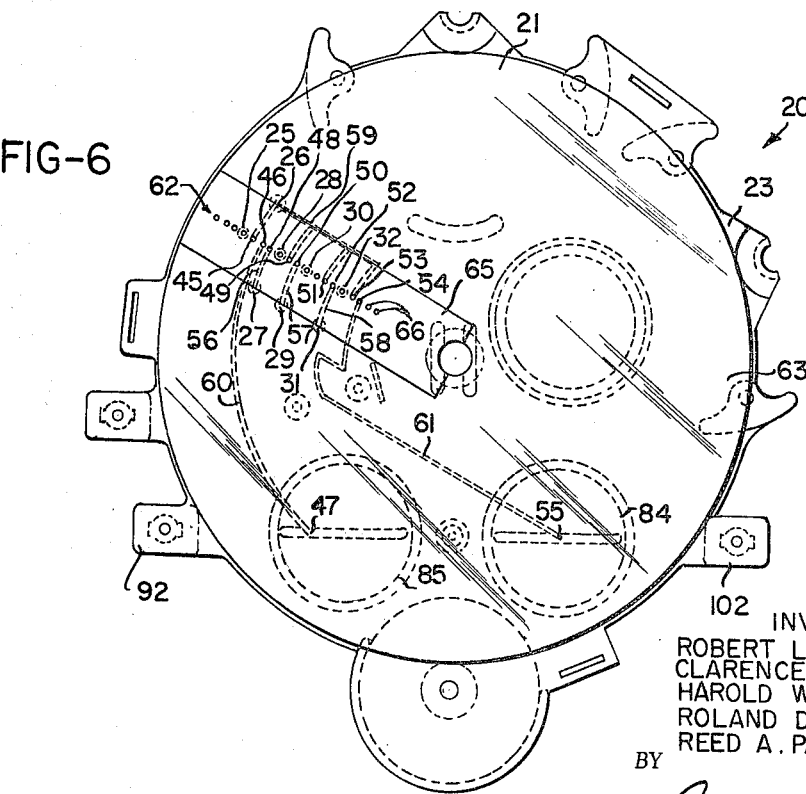

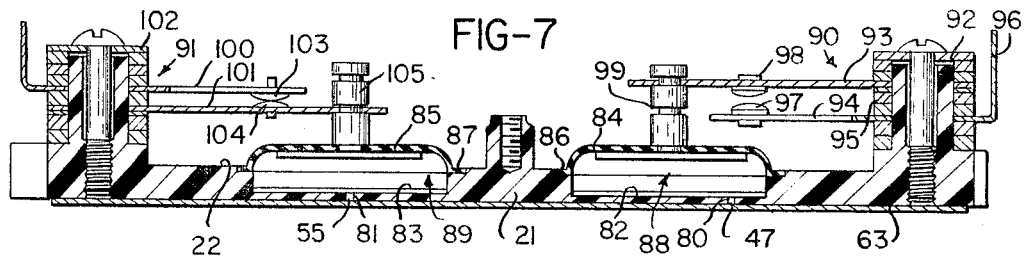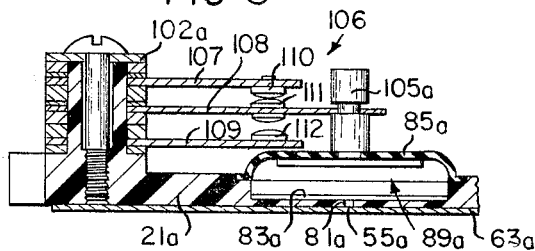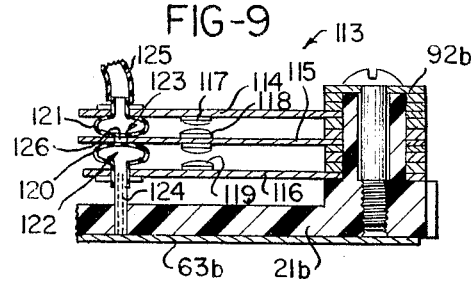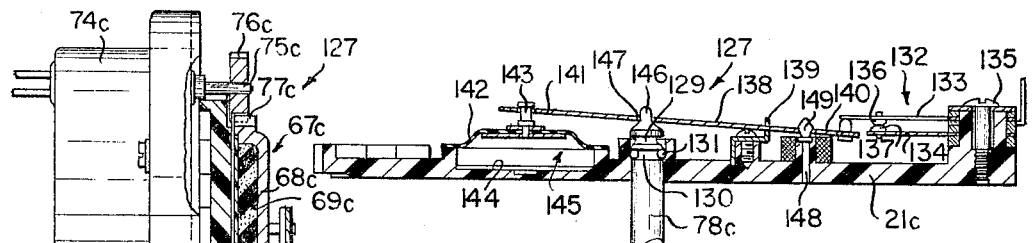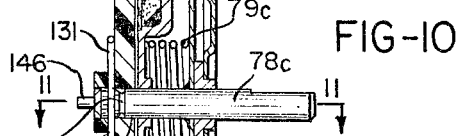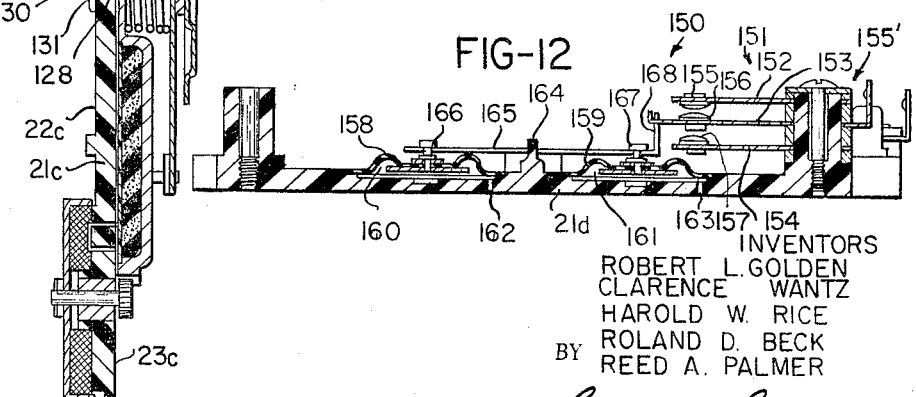

This invention relates to an improved control device as well as to improved parts therefor or the like and to the method for making such parts or the like.

More specifically, this invention relates to an improved program controller for controlling a vacuum program system or the like.

It is well known from the copending United States patent application Serial No. 153,300, filed November 20, 1961, and entitled "Pneumatic Programmer," now abandoned, that a control device or program controller can be provided for controlling a vacuum control system for a domestic appliance, such as an automatic washing machine or the like.

In general, such a programmer includes a base plate carrying a reading head having the reading surface thereof interrupted by a plurality of passages, one or more of the passages being interconnected by flexible conduits to a vacuum source and other of the passages being interconnected by flexible conduits to vacuum operated devices, such as electrical switches or the like. A reading member is rotatably carried by the base plate and has inverted channels provided in the reading side thereof in a predetermined pattern to respectively bridge a vacuum source passage with a vacuum operated device passage at a predetermined time relation in the program cycle to cause the vacuum operated device to operate at the desired time and for the desired time interval.

Thereafter, the reading member aligns an aperture means thereof with the vacuum operated device passage to permit the vacuum operated device to return to its atmospheric condition when it is desired to have that particular vacuum operated device cease functioning.

It has been found that a programmer of the above-described type and as set forth in the above-mentioned copending patent application has an excessive number of parts and requires many assembly operations whereby the overall cost of such a prior known programmer is relatively high.

However, according to the teachings of this invention, an improved programmer is provided wherein a great number of parts of the prior known programmer has been eliminated while the resulting programmer still performs the same functions in substantially the same manner.

In particular, the programmer of this invention includes an improved base plate wherein a large number of the prior used flexible conduits and connections thereof are eliminated.

Further, the improved base plate of this invention is adapted to uniquely carry certain of the vacuum operated devices, such as electrical switches or the like so as to reduce the number of parts of the programmer.

In addition, this invention provides improved vacuum operated electrical switches or the like to be utilized with such a programmer or the like.

Accordingly, it is an object of this invention to provide an improved pneumatic programmer having one or more of the novel features set forth above or hereinafter shown or described.

Another object of this invention is to provide an improved method for making certain parts of such a programmer or the like.

A further object of this invention is to provide improved parts for such a programmer or the like.

Another object of this invention is to provide improved vacuum operated electrical switches or the like to be utilized in connection with such a programmer or the like.

Other objects, uses and advantages of this invention are apparent from a reading of this description which proceeds with reference to the accompanying drawings forming a part thereof and wherein:

FIGURE 1 is a rear view of an improved pneumatic programmer of this invention.

FIGURE 2 is a cross-sectional view of the programmer illustrated in FIGURE 1 and is taken on line 2—2 thereof.

FIGURE 3 is an enlarged cross-sectional view of the reading head portion of the programmer illustrated in FIGURE 1 and is taken on line 3—3 thereof.

FIGURE 4 is a perspective view illustrating the improved base plate of the programmer of FIGURE 1.

FIGURE 5 is a cross-sectional view taken on line 5—5 of FIGURE 4.

FIGURE 6 is a front view of the programmer illustrated in FIGURE 1 with the reading element thereof removed.

FIGURE 7 is an enlarged cross-sectional view taken on line 7—7 of FIGURE 1 and illustrates some of the improved vacuum operated electrical switches of this invention.

FIGURES 8 and 9 are fragmentary views similar to FIGURE 7 and respectively illustrate other embodiments of the vacuum operated electrical switches of this invention.

FIGURE 10 is a view similar to FIGURE 2 and illustrates another embodiment of the programmer of this invention.

FIGURE 11 is a cross-sectional view taken on line 11—11 of FIGURE 10.

FIGURE 12 is a view similar to FIGURE 11 and illustrates another embodiment of this invention.

While the various features of this invention are hereinafter described and illustrated as being particularly adaptable for controlling a vacuum operated control system or the like, it is to be understood that the various features of this invention can be utilized singly or in any combination thereof to provide structure for other systems as desired.

Therefore, this invention is not to be limited to only the embodiments illustrated in the drawings, because the drawings are merely utilized to illustrate one of the wide variety of uses of this invention.

Referring now to FIGURES 1 and 2, an improved programmer of this invention is generally indicated by the reference numeral 20 and is adapted to control a vacuum operated control system for a domestic appliance or the like, such as an automatic washing machine, dishwasher or the like, in substantially the same manner as set forth in the aforementioned copending patent application.

The programmer 20 of this invention generally comprises a base plate 21 formed of plastic or other suitable material having opposed front and rear surfaces 23 and 22.

The base plate 21 has integral therewith a reading head portion located generally in the area of the reference numeral 24 in FIGURES 1 and 3, the surface 23 of the reading head portion 24 being interrupted by a plurality of ports 25, 26, 27, 28, 29, 30, 31, and 32 as illustrated in FIGURE 6, each port 25–32 being interconnected to a passage passing through the opposed surface 22 of the base plate 21 and disposed in aligned relation with a conduit nipple extending outwardly from the rear surface 22 of the base plate 21. For example, see FIGURE 3, wherein the ports 25, 28, 30 and 32 respectively are interconnected by passages 33, 34, 35 and 36 to conduit nipples 37, 38, 39 and 40 formed integrally with the base plate 21 and extending from the rear surface 22 thereof. Similarly, the ports 26, 27, 29 and 31 are respectively interconnected to conduit nipples 41, 42, 43 and 44 as illustrated in FIGURE 1.

The surface 23 of the base plate 21 also has a plurality of ports 45, 46, 47, 48, 49, 50, 51, 52, 53, 54, and 55 formed therein for a purpose hereinafter described.

The ports 27, 29, and 31 are respectively interconnected to ports 48, 50, and 52 by grooves 56, 57, and 58 formed in the front surface 23 of the base plate 21. Similarly, the ports 45, 49, 51, and 53 are respectively interconnected to the port 26 by a groove network 59 formed in the front surface 23 of the base plate 21 as illustrated in FIGURE 6.

The ports 46 and 47 are interconnected together by a groove 60 formed in the front surface 23 of the base plate 21. Similarly, the ports 54 and 55 are interconnected together by a groove 61 in the front surface 23 of the base plate 21.

In this manner, it can be seen that the ports 25, 45, 46, 48, 28, 49, 50, 30, 51, 52, 32, 53, and 54 are disposed in aligned relation and form a row 62 in the reading head portion 24 of the base plate 21 for a purpose hereinafter described.

While the ends of certain grooves in the front surface 23 of the base plate 21 have been previously described as interconnecting together a pair of ports, it is to be understood that such grooves and ports can be simultaneously made whereby the ports would merely be the ends of the grooves.

In order to provide a fluid-tight interconnection between the various ports interconnected by the grooves formed in the front surface 23 of the base plate 21, suitable cover means is secured to the front surface 23 of the base plate 21 to cover the grooves and ports and separate the networks from each other.

For example, as illustrated in FIGURES 3 and 4, a flexible tape 63 having any desired configuration is secured over the surface 23 of the base plate 21 to close the groove means and forts formed therein. While the tape 63 can comprise any flexible material, the embodiment thereof illustrated in the drawings, comprises a flexible tape 63 having a pressure sensitive adhesive 64 disposed on the under surface thereof so that the tape 63 can be readily secured to the surface 23 of the base plate 21 in the manner illustrated in FIGURES 4 and 6.

The tape 63 has a plurality of aperture means formed therein to be respectively aligned with the ports in the row 62 of the reading head portion 24 of the base plate 21.

After the tape 63 has been secured in place or before, a second flexible tape 65 is disposed on top of the tape 63 in the manner illustrated in FIGURE 4 in the region of the reading head portion 24 of the base plate 21, the second tape 65 also having aligned aperture means 66 formed therein adapted to respectively register with the aperture means in the flexible tape 63 and the ports in the row 62 of the reading head portion 24.

While the tape 65 can comprise any suitable material, the embodiment illustrated in the drawings comprises a flexible tape also having a pressure sensitive adhesive on the under surface thereof to enable the same to be secured on top of the flexible tape 63.

Therefore, it can be seen that any desired number of ports can be disposed in the row 62 in the reading head portion 24 of the base plate 21 and can be interconnected to other ports or to conduit nipples disposed in any desired position on the base plate 21 without requiring an interconnection therebetween by flexible conduits as provided in prior known programmers. This feature is accomplished by forming groove means in the surface 23 of the base plate 21 and covering the same by the tape means 63 and 65 in the manner previously described to provide separate passages in the base plate 21.

While the additional tape means 65 need not be utilized, it is desired to provide the same to provide a raised reading surface in just the region of the reading head portion 24 of the base plate 21 for a purpose hereinafter described.

One or more of the conduit nipples 37–44 can be interconnected to a vacuum source by flexible conduits or the like while the remaining conduit nipples can be interconnected to various vacuum operated devices by flexible conduits or the like. For example, the conduit nipple 41 can be interconnected to a vacuum source whereby the ports 45, 49, 51 and 53 in the row 62 of the reading head portion 24 of the base plate 21 will also be interconnected to such vacuum source because of the groove network 59.

When it is desired to impose a vacuum on a particular vacuum operated device, a reading element 67 of the programmer 20 interconnects a vacuum source port in the row 62 with the particular port in row 62 leading to that particular vacuum operated device in a manner now to be described.

As illustrated in FIGURE 2, the reading element 67 comprises a dome-like member 68 having an annular cavity 69 formed therein and closed at the open end thereof by annular flexible tape 70, the cavity 69 being filled with a suitable air filtering material 71.

The flexible tape 70 of the reading element 67 has a plurality of inverted channels 72 formed therein in the manner illustrated in FIGURE 3 so that each inverted channel 72 is adapted to bridge the space between a pair of adjacent ports disposed in the row 62 of the reading head portion 24. For example, the channel 72 in the flexible tape 70 of the reading element 67 illustrated in FIGURE 3 is interconnecting the ports 45 and 25 together whereby if the port 45 is interconnected to a vacuum source and the port 25 is interconnecting to a vacuum operated device, the reading element 67 is causing the vacuum operated device to have a vacuum imposed thereon to accomplish any desired function, such as closing an electrical switch or the like to perform a particular operation in the control cycle of the programmer 20.

After the particular vacuum operated device has been actuated in the above manner and it is desired to terminate such operation, suitable aperture means 73, FIGURE 3, formed through the flexible tape 70 of the reading element 67 are adapted to be aligned with the ports in the row 62 of the reading head portion 24 of the base plate 21 to permit air to enter the particular vacuum operated device so that the previously actuated vacuum operated device can return to normal atmospheric conditions.

Therefore, it can be seen that by so arranging the channels 72 and apertures 73 in the flexible tape 70 of the reading element 67, a desired sequence of operations can take place upon movement of the reading element 67 relative to the reading head portion 24 of the base plate 21 in any desired time relation.

For example, a suitable electric timer motor 74 can be carried by the base plate 21 in the manner illustrated in FIGURES 1 and 2 and have an output shaft 75 thereof interconnected to a pinion gear 76 disposed in meshing relation with a ring gear portion 77 of the reading element 67 to cause the reading element 67 to rotate about a control shaft 78 upon movement of the pinion gear 76 by the timer motor 74.

The reading element 67 is pushed into contact with the reading surface of the base plate 21 by a compression spring 79 in a manner fully set forth in the aforementioned copending patent application.

Therefore, it can be seen that the reading element 67 is adapted to be sequentially or continuously moved relative to the base plate 21 to respectively interconnect various ports in the row 62 together to cause a sequence of operation in a domestic appliance or the like.

While the operation of the programmer 20 has been previously described in connection with vacuum operated devices disposed remotely therefrom and interconnected thereto by flexible conduits attached to the conduit nipples, it is to be understood that the programmer 20 operates in substantially the same manner to operate vacuum operated devices carried by the base plate 21 and interconnected thereto by the previously described grooved means formed in the surface 23 of the base plate 21.

For example, the ports 47 and 55 formed in the base plate 21 of the programmer 20 are utilized to control vacuum operated devices carried directly by the base plate 21 whereby those vacuum operated devices do not require flexible conduits and connections as in the past.

For example, reference is made to FIGURE 7 wherein the ports 47 and 55 are respectively interconnected to passages 80 and 81 formed in the base plate 21 and leading respectively to open ended cavities 82 and 83 formed in the rear surface of the base plate 21.

A pair of flexible diaphragms 84 and 85 respectively have their outer peripheries 86 and 87 secured to the rear surface 22 of the base plate 21 and respectively cooperate with the cavities 82 and 83 to define chambers 88 and 89 therebetween which are adapted to be respectively interconnected to a vacuum source by the reading element 67 in the manner previously described.

In this manner, the diaphragms 84 and 85 are each adapted to be drawn toward the base plate 21 when vacuums are imposed in the chambers 88 and 89 thereof and thereby control various devices.

For example, the diaphragm 84 is adapted to control an electrical switch 90 carried by the base plate 21 in the manner hereinafter described while the diaphragm 85 is adapted to control an electrical switch 91 carried by the base plate 21 in a manner hereinafter described.

In particular, the base plate 21 has an integral and outwardly extending post 92 carrying a pair of switch blades 93 and 94 separated from each other by suitable insulators 95, the switch blades 93 and 94 being electrical conductors and being adapted to be interconnected to electrical circuitry by terminals 96 thereof.

The switch blade 94 carries an electrical contact 97 adapted to cooperate with an electrical contact 98 carried by the switch blade 93, the switch blade 93 being operatively interconnected to the flexible diaphragm 84 by a post 99 carried by the flexible diaphragm 84 and interconnected to the free end of the switch blade 93 in the manner illustrated in FIGURE 7.

When atmospheric conditions exist in the chamber 88 either the natural resiliency of the flexible diaphragm 84 or the natural resiliency of the switch blade 93 or both maintains the switch blade 93 in the position illustrated in FIGURE 7, whereby the contacts 97 and 98 are normally opened. However, when a vacuum condition is imposed in the chamber 88 under the control of the reading element 67 in the manner previously described, the flexible diaphragm 84 is drawn toward the base plate 21, whereby the switch blade 93 is pulled downwardly to bring the contact 98 thereof into contact with the contact 97 to complete an electrical circuit which controls the operation of a desired part of the washing machine or the like.

When it is desired to open the switch 90, air is permitted to return to the chamber 88 in the manner previously described, whereby the contacts 98 and 97 open to the position illustrated in FIGURE 7.

While the electrical switch 90 is normally an open switch, the switch 91 illustrated in FIGURE 7 is a normally closed switch and comprises a pair of switch blades 100 and 101 respectively mounted in insulated relation on a post 102 of the base plate 21, the switch blade 100 carrying an electrical contact 103 disposed in engagement with a contact 104 carried by the switch blade 101. The free end of the switch blade 101 is operatively interconnected to the diaphragm 8 by a post 105 secured to the diaphragm 85 and interconnected to the switch blade 101.

Thus, when the diaphragm 85 is disposed in the position illustrated in FIGURE 7, because of normal atmospheric condition in the chamber 89, the contacts 103 and 104 are disposed in engagement, whereby the switch 91 is normally closed.

However, when a vacuum condition is imposed in the chamber 89 by the reading element 67 in the manner previously described, the diaphragm 85 is drawn toward the base plate 21, causing the switch blade 101 to flex away from the switch blade 100 to move the contact 104 out of engagement with the contact 103, whereby the switch 91 will be opened.

Another vacuum operated electrical switch of this invention is generally indicated by the reference numeral 106 in FIGURE 8 and parts thereof similar to the switch 91 previously described are indicated by like reference numerals followed by the reference letter "a."

As illustrated in FIGURE 8, the electrical switch 106 includes three switch blades 107, 108 and 109 respectively insulated from each other on a post 102a of the base plate 21a and respectively carrying electrical contacts 110, 111 and 112, the electrical contact 111 of the intermediate switch blade 108 being cooperable with the contacts 110 and 112 of the outer switch blades 107 and 109 in a manner hereinafter described.

The intermediate switch blade 108 has the free end thereof operatively interconnected to the flexible diaphragm 85a by a post 105a secured to flexible diaphragm 85a and connected to the free end of the switch blade 108.

When an atmospheric condition exists in the chamber 89a, the switch 106 is disposed in the position illustrated in FIGURE 8, whereby electrical contact is made between the contacts 110 and 111.

However, when a vacuum condition is imposed in the chamber 89a, the flexible diaphragm 85a is drawn toward the base plate 21a to cause the switch blade 108 to move away from the switch blade 107 and break electrical contact between the contacts 111 and 110. Further movement of the diaphragm 85a toward the base plate 21a by the vacuum condition in the chamber 89a brings the contact 111 into electrical contact with the contact 112 to operate another electrical device or the like.

Another vacuum operated electrical switch of this invention is generally indicated by the reference numeral 113 in FIGURE 9 and parts thereof similar to the electrical switch 90 previously described are indicated by like reference numerals followed by the reference letter "b."

As illustrated in FIGURE 9, three switch blades 114, 115 and 116 are respectively carried in aligned and insulated relation on the post 92b of the base plate 21b in the manner previously described and respectively have switch contacts 117, 118 and 119, the contact 118 of the intermediate blade 115 being cooperable with contacts 117 and 119 of the outer blades 114 and 116.

An expansible and contractible element 120 is carried by the switch blade 116, while another expansible and contractible element 121 is carried by the switch blade 114, the elements 120 and 121 respectively comprising flexible diaphragms defining chambers 122 and 123.

The chamber 122 of the element 120 is adapted to be interconnected to the vacuum source by conduit means 124 of the base plate 21b, while the chamber 123 is adapted to be interconnected to the vacuum source by a flexible conduit 125 by a reading element in the manner previously described, the elements 120 and 121 being interconnected together by a member 126 passing through a suitable aperture in the free end of the switch blade 115.

When normal atmospheric conditions exist in chambers 122 and 123 of the elements 120 and 121, the switch blade 115 is disposed in the position illustrated in FIGURE 9 wherein the contact 118 thereof is disposed out of electrical contact with the contacts 117 and 119.

However, when a vacuum condition is imposed in the chamber 123 of the element 121, the switch blade 115 is drawn toward the switch blade 114, whereby the contact 118 is placed in electrical contact with the contact 117.

Similarly, when a vacuum condition is imposed in the chamber 122 of the element 120, the switch blade 115 is drawn toward the switch blade 116, whereby the contact 118 is disposed in electrical contact with the contact 119.

Another programmer of this invention is generally indicated by the reference numeral 127 in FIGURES 10 and 11 and parts thereof similar to the programmer previously described are indicated by like reference numerals followed by the reference letter "c."

As illustrated in FIGURES 10 and 11, the control shaft 78c is movably mounted in an aperture 128 passing through the base plate 21c, the control shaft 78c when moved to the left from the position illustrated in FIGURE 10 to the position illustrated in FIGURE 11 causing operation of the timer motor 74c and, thus, operation of the program system.

In particular, the control shaft 78c has a pair of annular channels 129 and 130 formed therein adapted to respectively receive a snap ring 131 carried by the base plate 21c. For example, when the control shaft 78c is disposed in the position illustrated in FIGURE 10, the snap ring 131 is received in the annular channel 129 thereof and holds the control shaft 78c in that position whereby the timer motor 74c is not operating in the manner hereinafter described.

However, when the operator pushes the control shaft 78c inwardly toward the base plate 21c, the snap ring 131 is received in the annular channel 130 thereof to hold the control shaft 78c in the position illustrated in FIGURE 11 to cause operation of the program system in a manner hereinafter described.

As illustrated in FIGURE 11, a master vacuum operated switch 132 is carried by the base plate 21c and comprises a pair of switch blades 133 and 134 respectively carried in insulated relation on a post 135 of the base plate 21c, the switch blade 133 having an electrical contact 136 cooperable with an electrical contact 137 carried by the switch blade 134.

When the contacts 136 and 137 are disposed in engagement with each other, electrical current is adapted to flow to the entire electrical circuitry of the system controlled by the programmer 127 as well as to the timer motor 74c to cause movement of the reading element 67c in a manner previously described.

However, when the contacts 136 and 137 are separated from each other in a manner hereinafter described, electrical current to the electrical circuitry is terminated, whereby the timer motor 74c ceases to operate and the program system is disposed in its "off" position.

As illustrated in FIGURE 11, a lever 138 is fulcrumed to the base plate 21c at a point 139 whereby the lever 138 is adapted to rock about the point 139 in a manner hereinafter described.

The end 140 of the lever 139 is operatively interconnected to the free end of the switch blade 133 so that when the lever is rocked about the fulcrum point 139 in a counterclockwise direction, the lever 138 separates the contacts 136 and 137 to dispose the program system in its "off" position.

The other end 141 of the lever 138 is operatively interconnected to a flexible diaphragm 142 by a post 143 in the manner previously described, the flexible diaphragm 142 cooperating with a cavity 144 in the base plate 21c to define a chamber 145 therebetween which is adapted to have a vacuum imposed in the same by the reading element 67c in the manner previously described.

The control shaft 78c has an end 146 passing through a suitable aperture 147 formed in the lever 138 for a purpose now to be described.

When the control shaft 78b is moved from the position illustrated in FIGURE 11 to the position illustrated in FIGURE 10, the natural resiliency of the diaphragm 142 pulls the lever 138 in a counterclockwise direction about the pivot or fulcrum point 139 to follow the new position of the end 146 of the control shaft 78c whereby the end 140 of the lever 138 moves upwardly and separates the contacts 136 and 137. Thus, it can be seen that when the control shaft 78c is disposed in the "off" position illustrated in FIGURE 10, the electrical switch 132 is opened and remains open to terminate the operation of the program system.

However, when the control shaft 78c is pushed inwardly relative to the base plate 21c by the operator, the end 146 of the control shaft 78c moves upwardly to the position illustrated in FIGURE 11 to cause rocking movement of the lever 138 about the fulcrum 139 in a clockwise direction about the fulcrum 139 to permit the switch contacts 136 and 137 to be disposed in electrical engagement in the manner illustrated in FIGURE 11, whereby the control system is in its "on" position.

As the reading element 67c moves relative to the base plate 21c by means of the timer motor 74c and the end of the particular operating cycle of the programmer 127 is reached, it is desired that the programmer 127 be automatically returned to its "off" position.

When such a condition is reached, the reading element 67c interconnects the vacuum source to the chamber 145 and causes the diaphragm 142 to be drawn toward the base plate 21c, whereby the lever 138 moves in a counterclockwise direction about the pivot point 139 and moves the control shaft 78c from the "on" position illustrated in FIGURE 11 to its "off" position illustrated in FIGURE 10 while simultaneously opening the contacts 136 and 137 of the electrical switch 132 to completely terminate the operation of the programmer 127 and hold the same in its "off" position by means of the snap ring 131 even though the chamber 145 subsequently returns to its normal atmospheric condition.

When the programmer 127 has been returned to its "off" position in the automatic manner set forth above, it is also desired that the entire vacuum system of the programmer 127 be returned to its normal atmospheric condition.

Therefore, a passage 148 is formed in the base plate 21c and is interconnected to the vacuum system so that should the passage 148 be opened the entire vacuum system is returned to its normal atmospheric condition.

The passage 148 is adapted to be closed by a rubber grommet type valve 149 carried by the lever 138 when the lever 138 is disposed in its "on" position, as illustrated in FIGURE 11.

However, when the control shaft 78c is returned automatically to its "off" position by the flexible diaphragm 142, the lever 138 rocks in a counterclockwise direction about the pivot point 139 to cause the valve 149 to move away from the passage 148 to dump the vacuum at the same time it opens the contacts 136 and 137 of the electric switch 132.

Thus, it can be seen that the programmer 127 of this invention provides means for not only automatically turning off the electrical circuitry of the programmer when the particular program of the reading element 67c has been completed, but also the programmer 127 automatically terminates the vacuum in the system thereof when the programmer 127 is automatically turned to the "off" position thereof.

Another programmer of this invention is generally indicated by the reference numeral 150 in FIGURE 12 and parts thereof similar to the programmer 20 previously described are indicated by the like reference numerals followed by the reference letter "d."

As illustrated in FIGURE 12, the base plate 21d has a vacuum operated electrical switch 151 carried thereby and comprising three switch blades 152, 153 and 154 respectively and insulatedly carried on a post 155' of the base plate 21d.

Electrical contacts 155, 156 and 157 are respectively carried by the switch blades 152, 153 and 154, the contact 156 of the intermediate switch blade 153 being adapted to cooperate with the contacts 155 and 157 of the outboard switch blades 152 and 154 in a manner hereinafter described.

For example, the programmer 150 can be utilized to control the operation of a domestic washing machine or the like wherein it is desired to operate the clothes tub at two different agitating spin speeds. Thus, when the contacts 155 and 156 are disposed in electrical contact with each other, the same energize a suitable motor to cause the clothes tub to agitate or spin at a particular speed. However, when the switch contacts 156 and 157 are disposed in electrical contact, the motor operates the clothes tub at a different speed whereby a two speed operation is provided by the electrical switch 151 which is operated in a manner now to be described.

As illustrated in FIGURE 12, a pair of flexible diaphragms 158 and 159 are respectively carried by the base plate 21d and cooperate therewith to define chambers 160 and 161 adapted to be selectively interconnected to a vacuum source by passage means 162 and 163 under the control of a reading element in the manner previously described.

A pivot post 164 extends rearwardly from the base plate 21d and passes through a suitable aperture in a lever 165 to provide a fulcrum point for the lever 165.

The lever 165 is respectively interconnected to the flexible diaphragm 158 and 159 by posts 166 and 167 in the manner previously described, the lever 165 having an arm 168 operatively interconnected to the free end of the intermediate switch blade 153.

The operation of the programmer 150 will now be described.

When the control knob of the programmer 150 is rotated to the desired position to determine the particular cycle of the washing machine required as well as the agitation or spin speed thereof, the reading element, at the proper time, will close the switch 151 to effect the proper motor speed.

For example, should a low motor speed be selected, the vacuum source will be interconnected to the chamber 160 to cause the flexible diaphragm 58 to be drawn toward the base plate 21d and cause the lever 165 to move in a counterclockwise direction about the fulcrum point 164 and close contacts 155 and 156.

Alternately, if the other motor speed has been selected, the vacuum source is interconnected to the chamber 161 to cause the flexible diaphragm 159 to be drawn toward the base plate 21d and thus cause clockwise movement of the lever 165 about the fulcrum point 164, whereby the contacts 156 and 157 are brought into electrical contact.

Therefore, it can be seen that a unique switching mechanism is provided for the programmer 150 to produce two different motor speeds in a domestic washing machine or the like.

However, it is to be understood that the embodiment illustrated in FIGURE 12 is not to be limited to a control for a domestic washing machine or the like, as the same can be utilized to control other apparatus as desired.

Therefore, it can be seen that this invention provides improved pneumatic programmers for various apparatus as well as to improved parts and to methods for making such parts or the like.

While the form of the invention now preferred has been disclosed as required by the statutes, other forms may be used, all coming within the scope of the claims which follow.

What is claimed is:

1. A reading head having opposed surfaces, means defining a pair of ports through one of said surfaces, means defining a groove in said one surface, said groove leading from one of said ports to the other port, a thin flexible tape secured on said one surface and covering said groove and ports, said tape having an aperture means passing therethrough and aligned with one of said ports, said tape conforming to the contour of said one surface of said reading head and being directly secured to said one surface at least completely around and at the periphery of said groove and ports, and means defining a passage interrupting the other surface of said reading head, said passage interconnecting with the other of said ports.

2. A reading head as set forth in claim 1 wherein a fluid operated electrical switch is carried by said other surface of said reading head and has a fluid chamber fluidly interconnected to said passage.

3. A reading head as set forth in claim 1 wherein a conduit nipple projects from said other surface of said reading head and is in communication with said passage.

4. A reading head as set forth in claim 3 wherein said conduit nipple is formed integral with said reading head.

5. A reading head as set forth in claim 1 wherein said flexible tape has a pressure sensitive adhesive surface disposed against said one surface of said reading head to secure said tape to said one surface.

6. A reading head as set forth in claim 1 wherein a second tape is secured on top of said first-named tape to provide a raised reading surface over said aperture means, said second tape also having an aperture means passing therethrough and aligned with said first-named aperture means.

7. A reading head as set forth in claim 1 wherein said groove also leads to an additional port formed in said reading head.

8. In combination, a reading head having opposed surfaces, means defining first, second, and third ports through one of said surfaces, means defining a groove in said one surface, said groove leading from said first port to said second port, a thin flexible tape secured on said one surface and covering said groove and ports, said tape having two aperture means passing therethrough and aligned with said first and third ports, said tape conforming to the contour of said one surface of said reading head and being directly secured to said one surface at least completely around and at the periphery of said groove and ports, a reading member movable over said tape and having means for selectively and fluidly interconnecting said first port with said third port so that said third port is fluidly interconnected to said second port, and a second tape being secured on top of said first-named tape to provide a raised reading surface over said aperture means for said reading member, said second tape also having an aperture means passing therethrough and respectively aligned with said first-named aperture means.

References Cited by the Examiner

UNITED STATES PATENTS

| | | | |
|---|---|---|---|
| 1,065,576 | 6/1913 | Amet | 200—46 |
| 2,381,582 | 8/1945 | Erickson | 200—83.2 |
| 2,806,096 | 9/1957 | Christopher | 200—46 |
| 2,827,522 | 3/1958 | Christopher | 200—46 |
| 2,919,320 | 12/1959 | Edwards et al. | 200—83.2 |
| 2,980,393 | 4/1961 | Bauerlein | 137—624.18 X |
| 3,074,431 | 1/1963 | Schwartz et al. | 137—624.18 X |

ROBERT K. SCHAEFER, *Primary Examiner.*

KATHLEEN H. CLAFFY, *Examiner.*

W. C. GARVERT, *Assistant Examiner.*